United States Patent [19]
Nimura et al.

[11] Patent Number: 4,937,751
[45] Date of Patent: Jun. 26, 1990

[54] NAVIGATION APPARATUS

[75] Inventors: Mitsuhiro Nimura; Shoji Yokoyama, both of Anjo, Japan

[73] Assignees: Aisin AW Co., Ltd., Aichi; Kabushiki Kaisha Shinsangyokaihatsu, Tokyo, both of Japan

[21] Appl. No.: 217,530

[22] Filed: Jul. 11, 1988

[30] Foreign Application Priority Data

Jul. 10, 1987 [JP] Japan ................. 62-173615

[51] Int. Cl.$^5$ ........................... G06F 15/50
[52] U.S. Cl. .................... 364/449; 364/444; 340/990; 340/995
[58] Field of Search .......... 364/443, 444, 449, 424.02, 364/460, 436; 73/178 R; 340/988, 990, 995; 369/21

[56] References Cited

U.S. PATENT DOCUMENTS

| | | | |
|---|---|---|---|
| 4,291,373 | 9/1981 | Mizote et al. | 369/21 |
| 4,490,717 | 12/1984 | Saito | 364/460 |
| 4,630,209 | 12/1986 | Saito et al. | 364/449 |
| 4,679,147 | 7/1987 | Tsujii et al. | 364/449 |
| 4,688,176 | 8/1987 | Hirata | 364/449 |
| 4,774,671 | 9/1988 | Itoh et al. | 364/444 |
| 4,812,845 | 3/1989 | Yamada et al. | 340/995 |

Primary Examiner—Gary Chin
Attorney, Agent, or Firm—Varndell Legal Group

[57] ABSTRACT

A navigation apparatus for navigating an automotive vehicle in accordance with a preset course while measuring distance travelled and steering angle is characterized by previously storing positions of characterizing features along the course and guidance information relating to said characterizing features, correlating travelling distance and the positions of the characterizing features, and outputting guidance information relating to a particular characterizing feature on the condition that said characterizing feature has been approached. Guidance information relating to a particular characterizing feature is outputted when the vehicle has approached this characterizing feature. Thereof, by matching this guidance information with the circumstances along the course, the driver can verify during travel whether the course is correct or not. Accordingly, even if it is a long distance to the intersection at which the next turn is to be made, the driver is capable of verifying the course by the time this intersection is reached. this enables the driver to drive the vehicle without anxiety.

6 Claims, 7 Drawing Sheets

| INTERSECTION NO. | INTERSECTION NAME | SMALLEST NO. OF ROAD HAVING THIS INTERSECTION AS STARTING POINT | SMALLEST NO. OF ROAD HAVING THIS INTERSECTION AS END POINT | TRAFFIC SIGNAL? |
|---|---|---|---|---|
| I | KANDA | 1 | 2 | YES |
| II | YUSHIMA | 2 | 1 | YES |
| III | — | 4 | 3 | NO |
| IV | — | 6 | 5 | |

FIG. 4C

| ROAD NO. | START-ING POINT | END POINT | NO. OF ROAD HAVING SAME STARTING POINT | NO. OF ROAD HAVING SAME END POINT | ROAD WIDTH | PROHI-BITION ① | PROHI-BITION ② | GUID-ANCE UNNEC-ESSARY | PHOTO-GRAPH NO. | NUMBER OF NODES | LEADING ADDRESS OF NODE SERIES DATA | LENGTH |
|---|---|---|---|---|---|---|---|---|---|---|---|---|
| 1 | I | II | 7 | 4 | 1 | — | — | 3 | 1 | 15 | 100 | |
| 2 | II | I | 3 | 8 | 1 | — | — | 7 | 2 | 13 | 200 | |
| 3 | II | III | 2 | 3 | 2 | — | — | 5 | 3 | 9 | 300 | |
| 4 | III | II | 5 | 6 | 2 | — | — | 2 | 4 | 20 | 500 | |
| 5 | III | IV | 4 | 7 | 2 | 6 | — | 8 | 5 | 25 | 600 | |
| 6 | IV | II | 8 | 1 | 1 | 3 | 2 | — | 6 | 30 | 700 | |
| 7 | I | IV | 1 | 5 | 0 | — | — | — | 7 | 9 | 800 | |
| 8 | IV | I | 6 | 2 | 0 | — | — | 1 | 8 | 3 | 900 | |

FIG. 4D

| ADDRESS | EAST LONGITUDE | NORTH LATITUDE | ATTRIBUTE |
|---|---|---|---|
| | 135.5 | 35.1 | 0 1 |
| | 135.6 | 35.2 | 0 1 |
| 100 | | | |
| 200 | | | |

FIG. 5A

| |
|---|
| INTERSECTION NAME |
| INTERSECTION NO. |
| PHOTOGRAPH NO. |
| ANGLE |
| DISTANCE |
| INTERSECTION NAME |

FIG. 5B

| CHARACTERIZING FEATURE | CONNECTING INTERSECTION ① | CONNECTING INTERSECTION ② | DISTANCE FROM CONNECTING INTERSECTION ① |
|---|---|---|---|
| A | I | II | 50 |
| ⋮ | ⋮ | ⋮ | ⋮ |

FIG. 6

| VOICE TRACK NO. | VOICE TRACK CONTENTS |
|---|---|
| 1 | TURN LEFT IN 200 METERS |
| 2 | TURN LEFT IN 300 METERS |
| 3 | TURN LEFT IN 500 METERS |
| 4 | TURN LEFT IN 700 METERS |
| 5 | TURN RIGHT IN 200 METERS |
| 6 | TURN RIGHT IN 300 METERS |
| 7 | TURN RIGHT IN 500 METERS |
| 8 | TURN RIGHT IN 700 METERS |
| 9 | FOLLOW THIS ROAD FOR 1 KILOMETERS |
| 10 | FOLLOW THIS ROAD FOR 2 KILOMETERS |
| 11 | FOLLOW THIS ROAD FOR 3 KILOMETERS |
| 12 | YOU WILL SOON CROSS A BRIDGE |
| 13 | YOU WILL SOON GO OVER A RAILROAD CROSSING |
| 14 | YOU WILL SOON PASS THROUGH AN UNDERPASS |
| 15 | YOU WILL SOON CROSS OVER A FOOTBRIDGE |
| 16 | YOU WILL SOON PASS THROUGH A TUNNEL |
| ⋮ | ⋮ |

NAVIGATION APPARATUS

BACKGROUND OF THE INVENTION

This invention relates to an apparatus for navigating a vehicle in accordance with a course set before travel starts. More particularly, the invention relates to a course guidance system in a navigation apparatus which informs a driver of characterizing features encountered along the course.

Recent years have seen extensive development of vehicular navigation systems in which a course is preset before travel starts and the driver is given course information in accordance with the preset course.

When the driver is guided along the preset course, the conventional navigation apparatus displays a map or the screen of a CRT and superimposes the course on the map.

Also, in an application filed separately by the present applicant in Japan on Feb. 27, 1987, as Patent Application No. 62-44796, there is disclosed a system in which information relating to an intersection at which the next turn is to be made is indicated to the driver by a CRT screen and voice tracks in accordance with the preset course. In this system, a photograph and the name of the intersection at which the next turn is to be made, the distance to this intersection and the shape thereof, and whether a right or left turn is to be made are displayed on the CRT screen. Together with this visual indication, the distance to the intersection and the direction of advance from this intersection are announced by voice tracks.

With the former prior-art arrangement in which the map and the superimposed course are displayed, a characterizing feature serving as a landmark in the vicinity of the present position of the vehicle is read, and it is necessary that the driver determine where his present travelling position is on the map and how far it is to a specific intersection. However, a highly detailed display cannot be presented on a small CRT of the type mounted in an automotive vehicle, and it is very difficult for the driver to read all of the necessary information while driving. Consequently, considerable attention must be paid in recognizing intersections and, hence, a great burden is placed upon the driver.

With the latter arrangement in which intersection information is outputted on the CRT screen and by voice track, no course guidance is given until the vehicle has approached the vicinity of an intersection. Consequently, if the distance between one intersection at which a turn has been made and an intersection at which the next turn is to be made is great, the driver cannot verify whether the course presently being travelled on is correct, and the driver is constrained to drive the vehicle while constantly in an anxious state until the intersection requiring a turn is reached.

SUMMARY OF THE INVENTION

Accordingly, an object of the present invention is to provide a navigation apparatus in which a driver is given course guidance information at an appropriate timing so that the flow of such information will not cease for an extended period of time.

Another object of the invention is to provide a navigation apparatus which enables course to be checked continuously in such a manner that the driver will not experience anxiety with regard to whether he is following a course correctly.

In accordance with the invention, the foregoing objects are attained by providing a navigation apparatus for navigating in accordance with a preset course while measuring distance travelled and steering angle, characterized by previously storing positions of characterizing features along the course and guidance information relating to said characterizing features, correlating travelling distance and the positions of the characterizing features, and outputting guidance information relating to a particular characterizing feature on the condition that said characterizing feature has been approached.

In accordance with the present invention as described above, guidance information relating to a particular characterizing feature is outputted when the vehicle has approached this characterizing feature. Therefore, by matching this guidance information with the circumstances along the course, the driver can verify during travel whether the course is correct or not. Accordingly, even if it is a long distance to the intersection at which the next turn is to be made, the driver is capable of verifying the course by the time this intersection is reached. This enables the driver to drive the vehicle without anxiety.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENT

An embodiment of the present invention will now be described with reference to the drawings.

Figure 1:
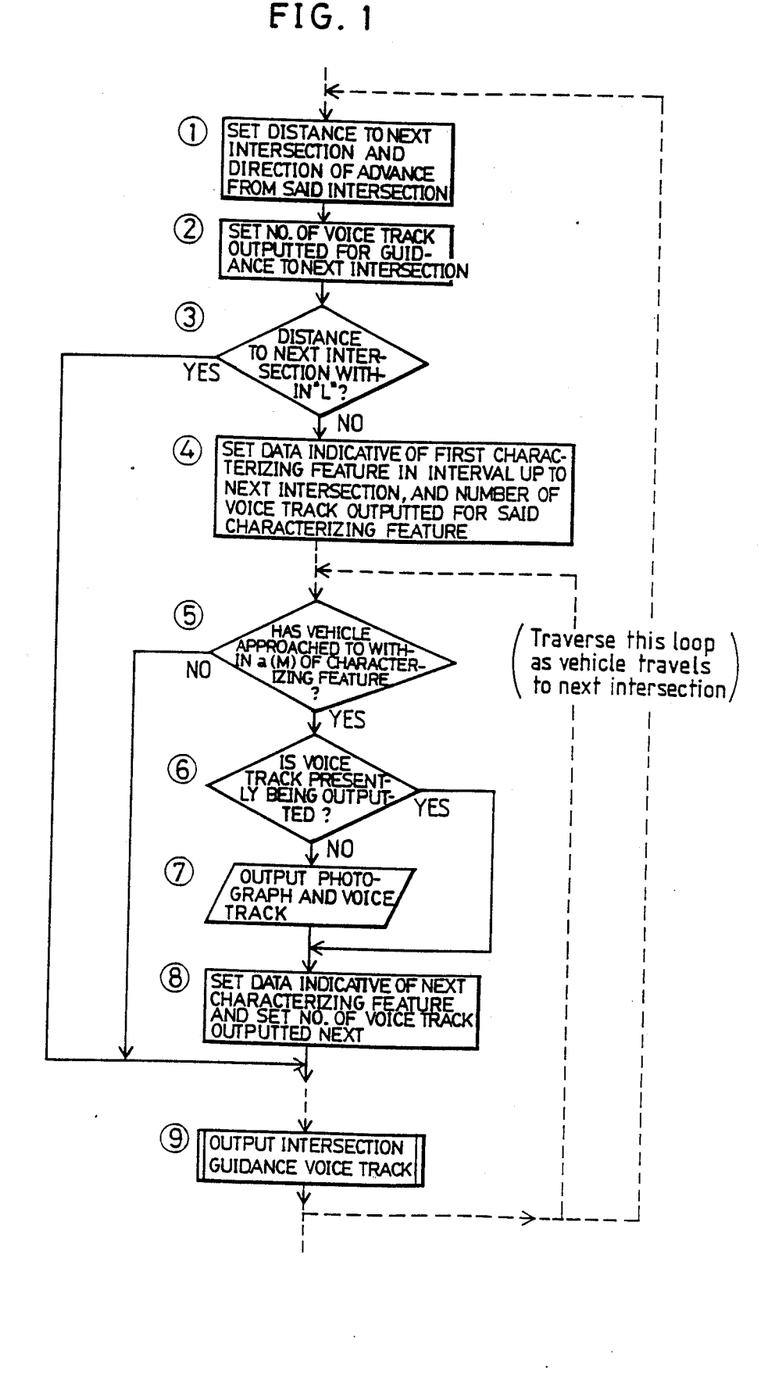
FIG. 1 is a flowchart for describing an embodiment in a case where guidance information is outputted in accordance with the course guidance method of the navigation apparatus of the invention.

A course guidance method in the navigation apparatus of the present invention is as illustrated in the flowchart of FIG. 1. The method includes the following steps:

① First, on the basis of route data, the distance to the next intersection and data indicating the direction of advance from the next intersection are set (i.e. stored in memory). The direction of advance is set by angle data contained in the route data.

② A voice track to be outputted at the next intersection is selected on the basis of the direction of advance set at step ①, and the number of this voice track is stored in memory. This number indicates the position at which the raw data of the voice track is located.

③ It is determined whether the distance from the present location of the vehicle to the next intersection is within a predetermined value L (meters). If the distance is not within the value L, the following step (4) is executed.

④ Characterizing features between the preceding intersection and the next intersection are retrieved from characterizing feature data based on the numbers of these two intersections, data (a photograph, etc.) and a voice track indicative of a characterizing feature corresponding to a characterizing feature that is between the present vehicle position and the next intersection but closest to the present vehicle position are selected, and the numbers of, say, the photograph and voice track are stored in memory.

⑤ It is determined whether the vehicle has approached to within a predetermined distance (a threshold value) of the characterizing feature. If the vehicle has done so, then the following step ⑥, is executed.

⑥-⑧ On the condition that another voice track is not being outputted, the photograph and voice track of the characterizing feature are outputted, and information relating to the characterizing feature is outputted based on the photograph and voice track. The next characterizing feature data and the voice track to be outputted next are selected, and the relevant numbers are stored in memory.

Figure 2:
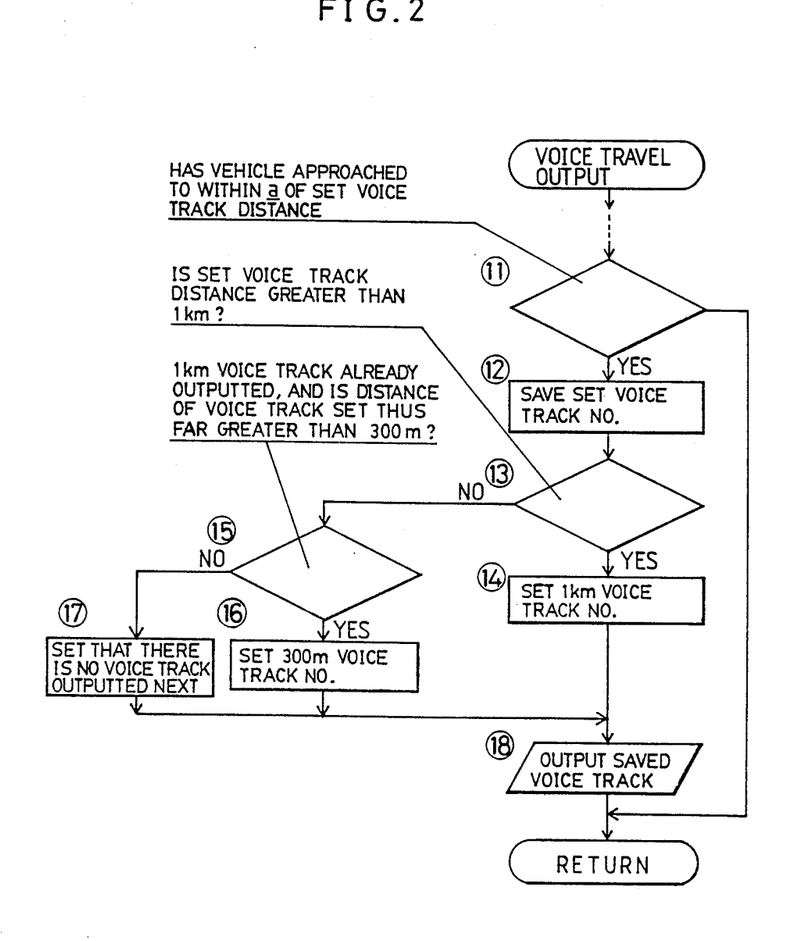
FIG. 2 is a flowchart illustrating the flow of processing for an intersection voice track output routine.

Intersection guidance is performed in accordance with the intersection guidance voice track output routine shown in FIG. 2. When the vehicle position approaches the preset voice track distance (the distance to the intersection at which the next turn is to be made) and the vehicle arrives within a meters (the threshold value) of this distance, the set voice track number is saved at this time [ ⑪ , ⑫ ] and the voice track number to be outputted next is set [ ⑬ through ⑰ ]. Thereafter, the voice track corresponding to the voice track number already saved is outputted [ ⑱ ].

Ordinarily, the processing of steps ⑤ through ⑨ [ ⑪ through ⑱ ] is repeatedly executed in accordance with travel up to the next intersection, and the processing of steps ① through ⑨ is repeatedly executed until the destination is reached.

Accordingly, and by way of example, if 5.4 km is set as the distance to the next intersection by the processing of step ① in FIG. 1, first a 5 km voice track number is set by the processing of step ②. When the vehicle approaches the 5 km mark and the remaining distance up to the 5 km mark falls within the threshold value a (meters), the 5 km voice track signal is saved by the processing of steps ⑪ and ⑫, and a 1 km voice track signal is set by the processing of steps ⑬, ⑭ as the number of the voice track outputted next. The voice track corresponding to the 5 km voice track number is outputted by the processing of step ⑬. Thereafter, the program returns to the processing of step ④ to execute the same processing, a 300 m voice track number is set by the processing of steps ⑬, ⑮ and ⑯, and the voice tracks corresponding to 1 km and 300 m voice track numbers are successively outputted by the processing of step ⑱.

If the distance to the intersection at which the next turn is to be made is great, a voice track announcement corresponding to a characterizing feature to be passed en route is made when the vehicle approaches the site of the feature. Examples of such voice tracks are "YOU WILL SOON ARRIVE AT A BRIDGE" and "YOU WILL SOON ARRIVE AT A RAILROAD CROSSING". Also, a picture of the vicinity surrounding the characterizing feature is projected on the CRT display screen. Examples of characterizing features are those of a public nature, such as bridges, railroad crossings, crosswalks, underpasses, bridges over the roadway, tunnels, police stations, fire departments, post offices, schools, city offices and the like. These facilities are easy to recognize. Moreover, since they are commonly used in guidance along various courses, the memory capacity required can be reduced. In addition to the aforementioned facilities, other characterizing features include natural scenery such as mountains and trees and the nature thereof.

Figure 3:
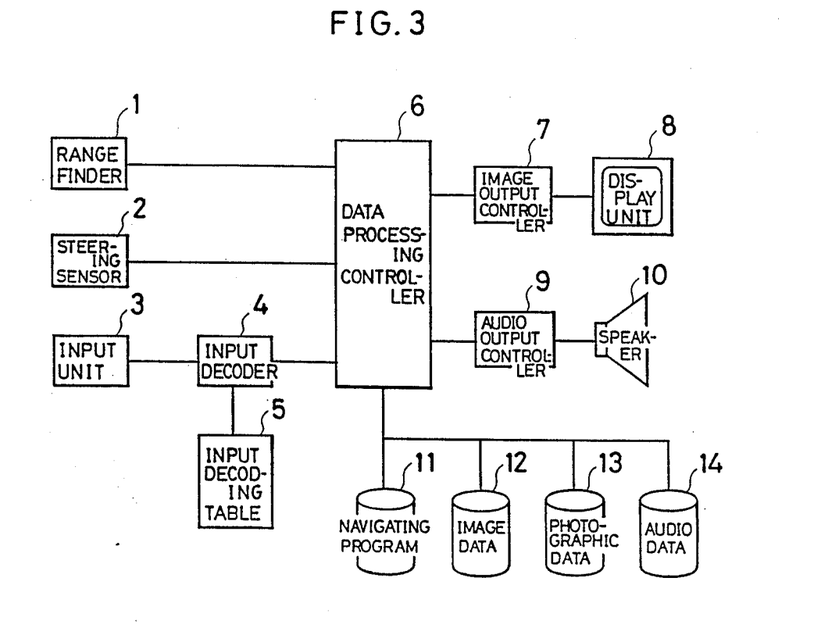
FIG. 3 is a block diagram illustrating an example of the structure of a navigation system to which the course guidance method of the inventive navigation apparatus is applied.

FIG. 3 illustrates an example of the system configuration of a navigation apparatus which performs the above-described course guidance.

In FIG. 3, the arrangement includes a range finder 1, a steering angle sensor 2, an input unit 3, an input decoder 4, an input decoding table 5, a data processing controller 6, an image output controller 7, a display unit 8, an audio output controller 9, a speaker 10 and files 11 through 14.

The range finder 1 measures the distance travelled by an automotive vehicle. Examples of the range finder 1 include means for detecting and counting the number of revolutions of a wheel, means for detecting acceleration and double-integrating the result, etc. Other measuring means may also be employed. The steering sensor 2 senses whether the vehicle has turned at an intersection. By way of example, the steering sensor 2 employs an optical rotary sensor or a rotating-type variable resistor attached to a rotating part of the steering wheel. The input unit 3 is a joy stick, key or touch-type panel. Alternatively, the input unit 3 can be interlocked with the screen of a display unit 8, and a key or menu can be displayed on the screen to enable inputs to be made from the screen. The input decoder 4 is adapted to decode input data from the input unit 3 while referring to the input decoding table 5. When a course is to be set, for example, the present location of the vehicle and the destination are inputted in the form of codes, whereupon the input decoder 4 effects a conversion into present location data and destination data based on the codes by referring to the input decoding table 5. Accordingly, the input decoding table 5 is set in accordance with the data inputted from the input unit 3. The data processing controller 6 is the brain of the navigation system. When a course has been selected and set at the input unit 3, the controller 6 calls and executes navigation data for this course from the file 11 storing the data. Each item of navigating data is designed to display an information map, which is in line with the course travelled, on the screen of the display unit 8, project characteristic photographs at intersections and at points along the course, display remaining distances to intersections as well as other guidance information, and give audible information in the form of voice tracks broadcast from the speaker 10. These images, photographs and audio data are stored in files 12 through 14, respectively. The outputting of images to the display unit 8 is controlled by the image output controller 7, and the outputting of audio to the speaker 10 is controlled by the audio output controller 9.

Figure 4A:
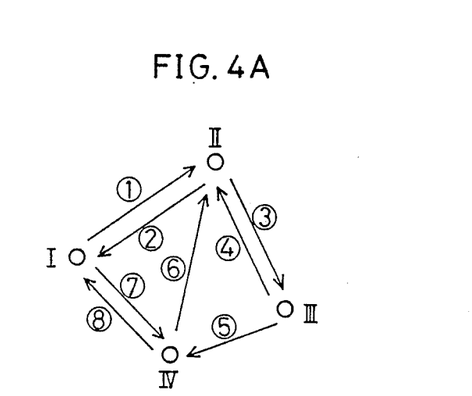
FIGS. 4A through 4D are views illustrating an example of basic data for creating navigation data.

As an example, assume that a road network comprises intersection numbers I–IV and road numbers ①-⑧, as shown in FIG. 4A. In such case, the intersection data will have the data configuration shown in FIG. 4B, the road data will have the data configuration shown in FIG. 4C, and the node series data will have the data configuration shown in FIG. 4D.

Figure 4B:
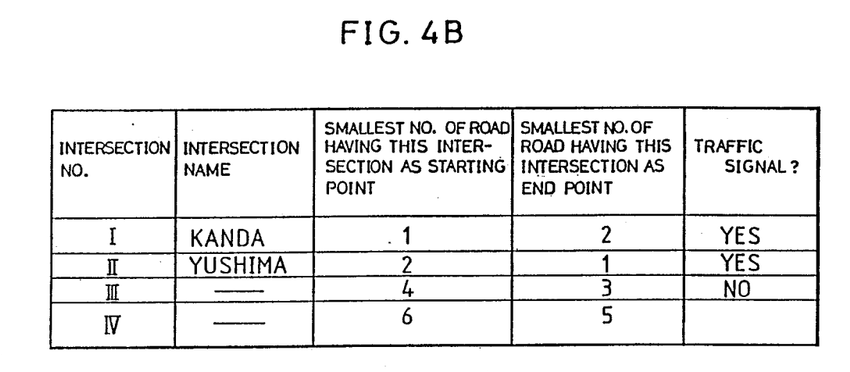

As shown in FIG. 4B, the intersection data comprises intersection names corresponding to the intersections numbers I-IV, road numbers having the smallest numbers among those roads possessing a certain intersection as a starting point, road numbers having the smallest numbers among those roads possessing a certain intersection as an end point, and information indicating whether or not a certain intersection has a traffic signal.

Figure 4C:
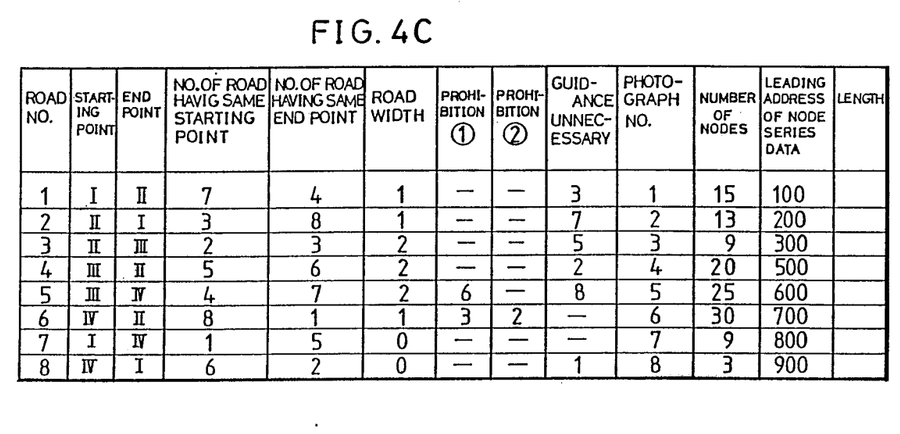

As shown in FIG. 4C, the road data comprises starting and end points, in the form of intersection numbers, of the road numbers ① through ⑧, the numbers of roads having the same starting point, the numbers of roads having the same end point, road width, information relating to prohibitions, information relating to guidance not required, photograph numbers, the numbers of nodes, the leading addresses of node series data, length, etc.

Figure 4D:
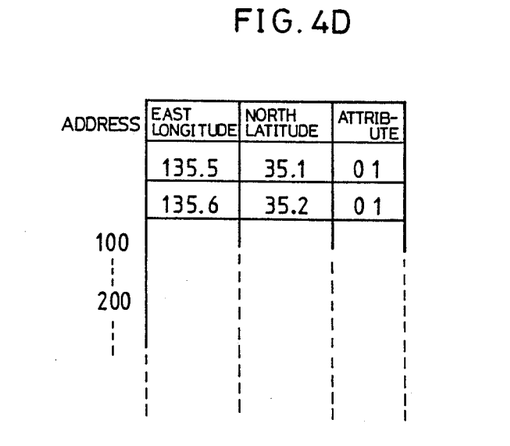

As shown in FIG. 4(D), the node array data comprises information relating to east longitude, north latitude, attributes and the like. The units of the road numbers comprise a plurality of nodes, as is evident from the road data. More specifically, the node data is data relating to one point on a road. If a line connecting nodes is referred to as an arc, a road is expressed by connecting each of a plurality of node arrays by arcs. For example, with regard to road number ①, the road comprises 15 nodes and the leading address of the node array data is 100, based on the road data. Therefore, road number ① is composed of node data having addresses 100 to 114.

Figure 5A:
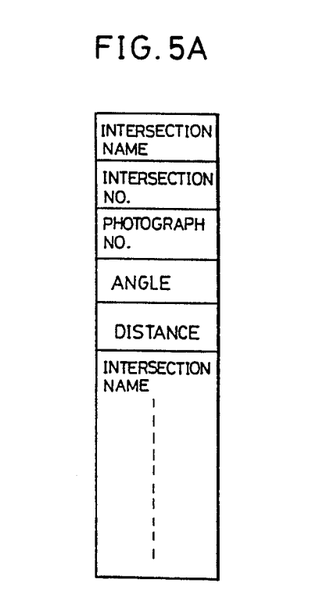
FIGS. 5A and 5B are views illustrating an example of loop data and characterizing feature data constituting navigation data.
Figure 5B:
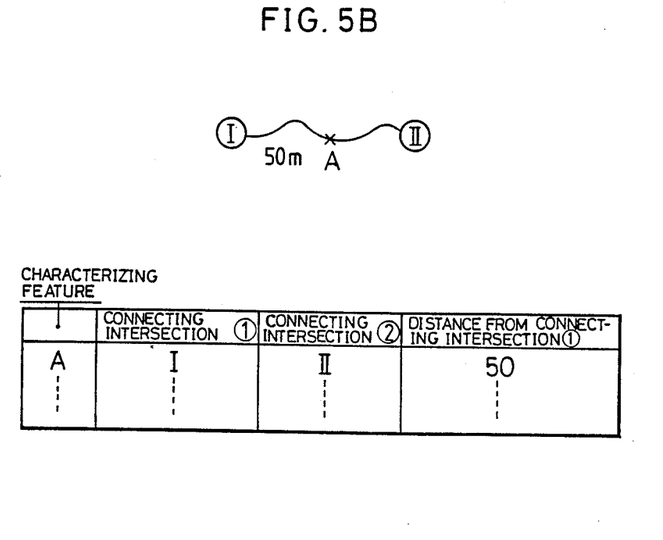

Let us take intersection number I as an example. For a course having this intersection as a starting point, first road number ① is retrieved from the starting point information of the intersection point data, then road number ⑦ is retrieved from the road data relating to the road number ⑦, namely from the column reading "NO. OF ROAD HAVING SAME STARTING POINT". Since the same information for road number ⑦ will, in converse fashion, lead to retrieval of road number ①, one can determine that there are no other road numbers available as peripheral roads. The same will hold true with regard to end points. Further, since road number ⑥ will be prohibited in case of road number ⑤ in the road data, the vehicle will not be able to enter road number ⑥ from road number ⑤ at the intersection number IV shown in FIG. 4A because turns are prohibited at this intersection. The only road that can be entered is the road number ⑧. Accordingly, guidance to road number ⑧ is unnecessary. By providing the road data with road numbers indicative of roads that cannot be entered because of prohibited turns and road numbers indicative of roads for which guidance is not required, the necessary information storage capacity can be reduced and route retrieval can be facilitated. By relying upon such data, peripheral roads from an intersection (with the exception of roads for which entry is forbidden because of prohibited turns or the like) are retrieved, road width, the need or lack of need for guidance and other conditions necessary for computing an ideal route are set, and the optimum route from the designated starting point to the destination is retrieved. In accordance with the retrieved ideal route, route data shown in FIG. 5A and characterizing feature data shown in FIG. 5B are created as navigation data.

The route data comprises the intersections, in order of nearness, from the starting point to the destination along the retrieved optimum route. The characterizing feature data relates to the characterizing features between intersections.

Figure 6:
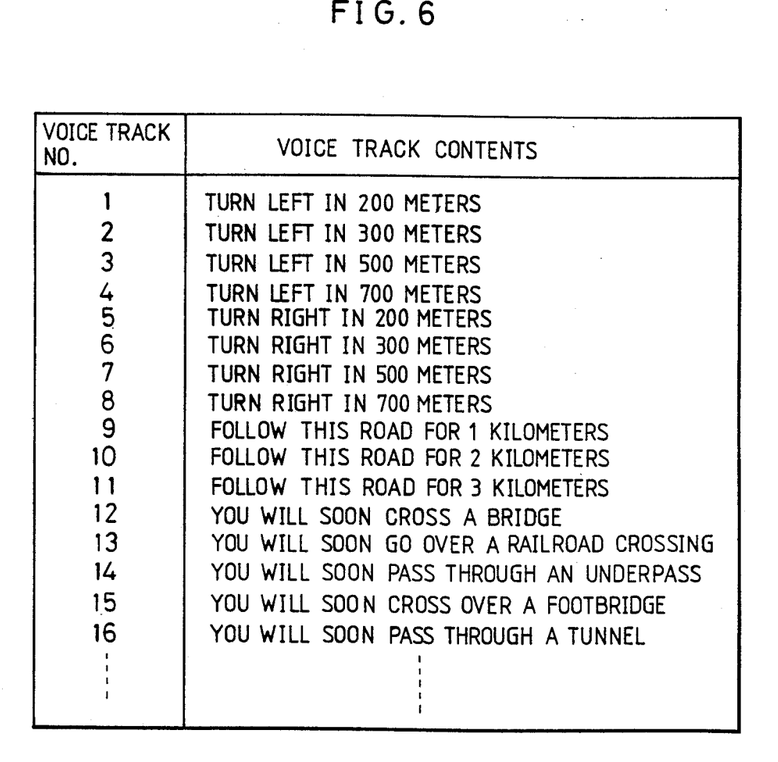
FIG. 6 is a view illustrating an example of a voice track list.

In accordance with the above-described navigation system, the driver selects a course by entering his present location and desired destination from the input unit 3 before travelling. When this has been accomplished, the data processing controller 6 reads and executes the navigating program in file 1 corresponding to this course. In accordance with the course, and on the basis of the measurement information from the range finder 1 and steering sensor 2, the aforementioned execution of the data determines the present vehicle location, displays the course information map, and the like, and informs the driver of characteristic features and intersections along the route, via the display unit 8 and speaker 10. The navigation data includes which data are to be used under what conditions, these data being taken from the files 12 through 14 storing the data for the abovementioned input outputs and the data for the voice track outputs. An example of a voice track list is as shown in FIG. 6.

The present invention is not limited to the embodiment described above but can be modified in various ways. For example, though information relating to a characterizing feature is outputted in the form of a picture and voice track in the foregoing embodiment, it is possible to adopt an arrangement in which only the picture or voice track is used, depending upon the navigation conditions at the time. Furthermore, in a case where a large number of proper nouns are involved, a large memory capacity will be required since there will be little opportunity for such information to be shared among a variety of courses. Accordingly, an arrangement can be adopted in which such information is distributed between photographs and voice tracks in a suitable manner.

Thus, in accordance with the present invention as set forth above, characterizing features serving as landmarks in the vicinity of the present location of a travelling vehicle are indicated to the driver in the form of voice tracks and images. Therefore, even if it is a long distance to the next intersection, the driver is capable of readily verifying whether the course being travelled is correct. This makes it possible for the driver to drive the vehicle without anxiety. In addition, since the information relating to the characterizing features is provided in the form of voice tracks and images, it is possible for the driver to easily understand the information even while he is in the act of driving.

DESCRIPTION OF APPENDIX

The attached material is an example of specific navigation data in C language to which the present invention is applied. For example:

a is a step for setting the distance to the next intersection, namely a step corresponding to the processing of step 1 shown in FIG. 1;

b is steps 2 to 4 shown in FIG. 1;

c is steps 5—shown in FIG. 1;

d is a routine for the above-mentioned b; and e is a routine for the above-mentioned c.

What we claim is:

1. A course guiding system of a navigation apparatus for a vehicle comprising:

departure point input means for inputting a departure point;

destination point input means for inputting a destination point;

guiding information output means for outputting guiding information;

a map data base having intersection data and road data;

a characteristic feature data base having data characteristic features corresponding to said intersection data and road data;

course setting means for setting a course between said departure point and said destination point in accordance with said intersection data and said road data;

distance sensor means for detecting travel distance of said vehicle;

a steering sensor means for detecting vehicle steering angle;

instant position detecting means for detecting an instant position of said vehicle based upon signals received from said distance sensor and said steering sensor means;

remaining distance means for determining whether remaining distance between said instant position and a next intersection is within a predetermined value;

first guiding means for delivering to said guiding information output means guiding information concerning said next intersection when said remaining distance means has determined that said remaining distance is within said predetermined value; and second guiding means for delivering to said guiding information output means guiding information based on said characteristic feature data base corresponding to said detected instant position, when said remaining distance means has determined that said remaining distance is greater than said predetermined value.

2. A course guiding system of a navigation apparatus according to claim 1, further comprising:

third guiding means which, when said remaining distance means has determined that said remaining distance is greater than a predetermined value, delivers distance guiding information to said guiding information output means at predetermined distances; and selection means for selectively delivering guidance information from said second and third guiding means to said guiding information output means.

3. A course guiding system of a navigation apparatus according to claim 1, wherein said output means includes an image display means, and said characteristic feature data base includes image data.

4. A course guiding system of a navigation apparatus for a vehicle comprising:

input means for inputting a departure point and a destination point;

distance sensor means for detecting travel distance of said vehicle;

steering sensor means for detecting vehicle steering angle;

output means for outputting guidance information;

memory means having a map data base including intersection and road data, and a characteristic feature data base including characteristic feature data corresponding to said intersection and road data; and controller means for reading said memory means, receiving signals from said input means, said distance sensor means and said steering means, and providing said guidance information to said output means, said controller means including:

(a) course setting means for setting a course between said departure point and destination point in accordance with said intersection and road data, (b) instant position means for determining an instant position of said vehicle based upon signals from said distance sensor and said steering sensor means, (c) remaining distance means for determining whether remaining distance between said instant position and a next intersection is within a predetermined value;

(d) first guiding means for providing, as said guiding information, information concerning said next intersection when said remaining distance is within said predetermined value; and (e) second guiding means for providing, as said guiding information, information from said characteristic feature data base corresponding to said instant position when said remaining distance is greater than said predetermined value.

5. The course guiding system of a navigation apparatus for a vehicle according to claim 4, wherein said controller means further includes:

(f) third guiding means for providing, as said guidance information, distance guiding information at predetermined distances when said remaining distance is greater than said predetermined value, and (g) selection means for selectively providing, as said guidance information, information from said second and third guiding means.

6. The course guiding system of a navigation apparatus for a vehicle according to claim 4, wherein said output means includes image display means, and said characteristic feature data base includes image data.

* * * * *